(12) United States Patent
Colon et al.

(10) Patent No.: US 11,463,475 B1
(45) Date of Patent: Oct. 4, 2022

(54) CLICK-TO-CALL FRAUD DETECTION

(71) Applicant: Amazon Technologies, Inc., Seattle, WA (US)

(72) Inventors: Brendan Cruz Colon, Seattle, WA (US); Manraj Tatla, Brampton (CA); Christopher Miller, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 13 days.

(21) Appl. No.: 17/211,299

(22) Filed: Mar. 24, 2021

(51) Int. Cl.
| | |
|---|---|
| *H04M 3/42* | (2006.01) |
| *G06N 3/04* | (2006.01) |
| *G06N 3/08* | (2006.01) |
| *H04M 3/38* | (2006.01) |
| *H04L 9/40* | (2022.01) |
| *H04M 7/00* | (2006.01) |

(52) U.S. Cl.
CPC ....... *H04L 63/1458* (2013.01); *G06N 3/0445* (2013.01); *G06N 3/08* (2013.01); *H04M 3/38* (2013.01); *H04M 3/42195* (2013.01); *H04M 7/003* (2013.01)

(58) Field of Classification Search
None
See application file for complete search history.

(56) References Cited

U.S. PATENT DOCUMENTS

| | | | |
|---|---|---|---|
| 5,966,650 A * | 10/1999 | Hobson | H04M 15/47 455/410 |
| 10,225,406 B1* | 3/2019 | Avital | G06Q 30/0273 |
| 2010/0128862 A1* | 5/2010 | Vendrow | H04M 3/38 379/198 |
| 2015/0051970 A1* | 2/2015 | Stafford, Jr. | G06Q 30/0251 705/14.47 |
| 2020/0128126 A1* | 4/2020 | Newman | H04M 3/436 |
| 2020/0410378 A1* | 12/2020 | Williams | G06N 20/00 |
| 2021/0160276 A1* | 5/2021 | Broadworth | H04L 65/1046 |
| 2021/0192527 A1* | 6/2021 | Li | G06Q 20/42 |
| 2021/0360407 A1* | 11/2021 | Obaidi | H04M 15/47 |

* cited by examiner

*Primary Examiner* — Harry S Hong
(74) *Attorney, Agent, or Firm* — K&L Gates LLP

(57) ABSTRACT

Devices and techniques are generally described for fraud detection. In various examples, first data may be received from a remote computing device, the first data specifying at least one of a first internet protocol (IP) address or a first telephone number by a fraud detection service using an application programming interface (API) of the fraud detection service. In some examples, a first machine learning model of the fraud detection service may determine a first confidence score indicating a likelihood that at least one of the first telephone number or the first IP address is associated with fraudulent activity. In some examples, output data may be sent to the first remote computing device via the API, the output data indicating a determination as to whether at least one of the first IP address or the first telephone number is associated with fraudulent activity.

20 Claims, 6 Drawing Sheets

CLICK-TO-CALL FRAUD DETECTION

BACKGROUND

Online fraud attempts and denial-of-service (DoS) attacks continue to grow year-over-year, putting pressure on online entities and network administrators to innovate in order to protect customers and prevent service disruption. The field of online fraud detection and cyberattack prevention can be categorized as an adversarial environment, where those with intentions to commit fraud and/or malicious cyber attacks are pitted against those endeavoring to prevent and deter such activity. This "arms race," as it is often referred to, involves continuous adaptation, as tactics of the opponents evolve over time.

DETAILED DESCRIPTION

Figure 1:
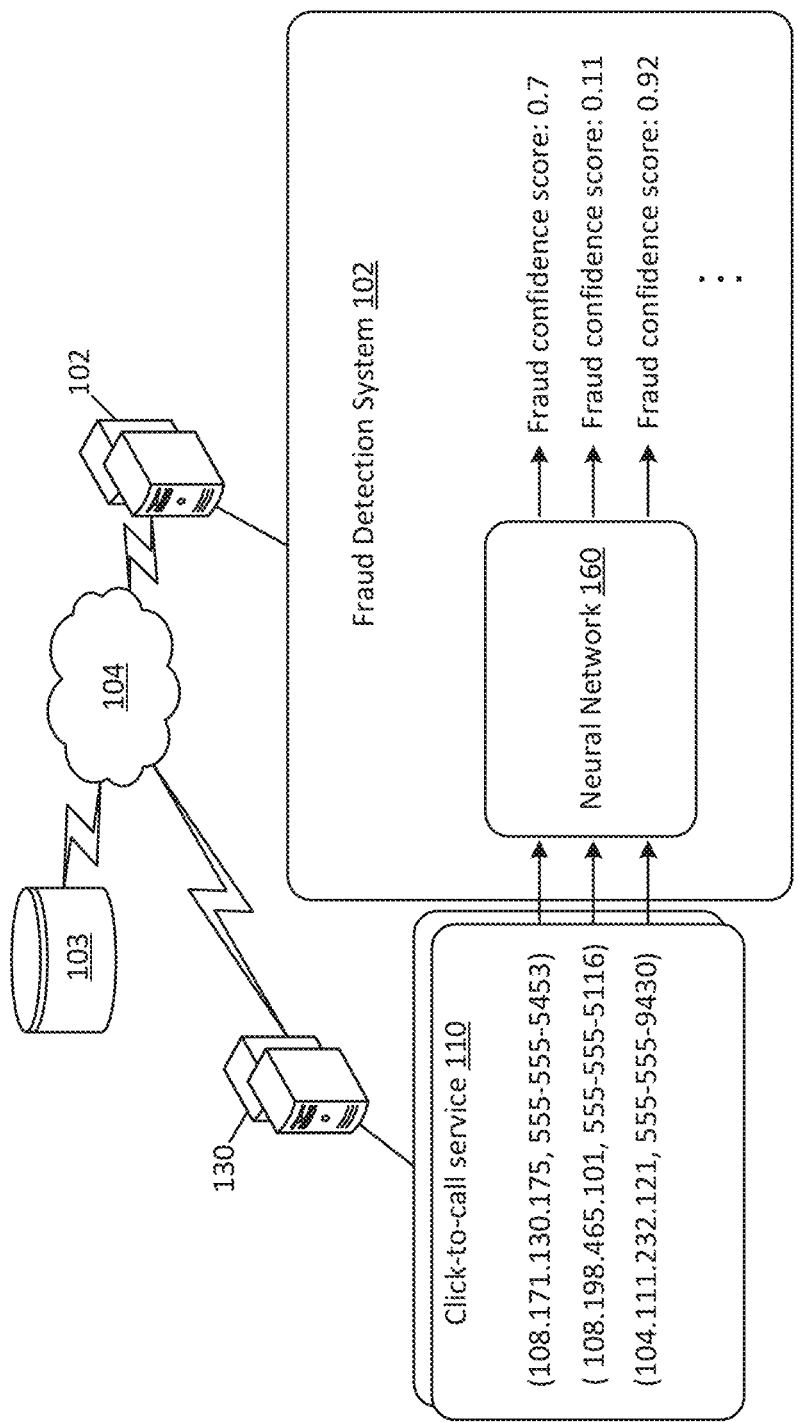
FIG. 1 is a block diagram illustrating detection of fraudulent click-to-call attacks using a fraud detection system, according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Perpetrators of transactional fraud and other cyber-attacks continually attempt to modify their behavior and/or the characteristics of their attacks and/or fraudulent transactions in order to avoid detection by automated filters and/or machine learning models used to distinguish between potentially fraudulent transactions and non-fraudulent transactions. As a result, technologies are continuously developed by fraud prevention and cyber-security teams to attempt to detect and prevent such attacks in an ever-evolving climate. Accordingly, the actions of perpetrators of fraud and other cyber attacks and cyber security teams are adversarial in nature, as a change in attack detection techniques results in evolving attack methodologies, and vice versa.

In various examples, attackers modify network identifiers in order to mask the identity of the attacker and/or to make the attacks appear as though they are legitimate service requests. For example, attackers may modify phone numbers, internet protocol (IP) addresses, geo-location data, and/or other hierarchical data representations associated with attacks and/or fraudulent transactions in order to cyber attack prevention measures.

In an example of such attacks, some online services provide a "click-to-call" service (or other call-back service) whereby users can provide a telephone number and may request a call from the online service (e.g., an automated click-to-call for a technical support callback) using a graphical user interface provided by the online service. However, perpetrators of fraud (sometimes referred to as "fraudsters") have set up premium phone numbers that charge a fee to the calling entity every time the phone number is called. A portion of that fee is then passed on to the callee. The fraudsters may set up automated systems whereby they make a large volume of click-to-call requests causing the click-to-call service to call premium phone numbers in order to defraud the company providing the click-to-call service. Such fraud is sometimes referred to as "premium phone number abuse" fraud. In order to avoid fraud detection filters, the IP addresses used to make such requests and/or the premium phone numbers themselves may be modified over time such that it appears as though different IP addresses and/or phone numbers are being used, when in reality the IP addresses and/or phone numbers are part of the same fraudulent scheme.

Described herein are neural networks that are able to detect such fraudulent click-to-call service requests. Although supervised machine learning techniques have been developed for solving predictive tasks (such as predicting whether or not a particular click-to-call request is likely to be fraudulent), it has been difficult to amass a large training data corpus that may be used to train a neural network and/or other machine learning model for such a task. Accordingly, described herein are systems and techniques that may be used to detect fraudulent click-to-call requests and generate training samples that comprise at least one of a telephone number (e.g., the number requested for a telephone call as part of the click-to-call request), an IP address (e.g., the IP address from which the click-to-call request was received), and a binary label indicating whether or not the request is fraudulent. Such training samples may be used to train a neural network to generate confidence scores (indicating the likelihood of a click-to-call request being fraudulent) based on an input including a telephone number, an IP address, or both. In some examples, a long short term memory (LSTM) model (or another model that is able to determine patterns in sequential data) may be particularly advantageous for such fraud prediction tasks since the LSTM may be able to detect patterns in hierarchical data representations (e.g., phone numbers, IP addresses) and may learn to attend to more significant portions of such hierarchical data when detecting fraud.

It has been observed that modification of IP addresses and phone numbers (and more generally modification of any hierarchical data representations) to avoid detection typically preserves large proportions of the original sequence—typically modifying only a few numbers. Accordingly, accounts that are associated with large IP/phone number pools generally have several clusters with very similar sequences. Traditional means of determining similarity in a feature space often include determining a Euclidean and/or cosine distance between data points. However, Euclidean distance determination is extremely sensitive to the position of a changing value within numbers. For example, the Euclidean difference between the numbers 1,000 and 1,001 is relatively small, but the Euclidean difference between the numbers 9,000 and 1,000 is much larger, despite only a single digit being changed in each of the two examples.

Accordingly, in various examples describing generation of training data that are described herein, hierarchical data representations (such as phone numbers, IP addresses, geolocation coordinates, etc.) may be treated as strings and a distance between any two strings may be represented by the number of "edits" or "substitutions" between the two strings. For example, the strings "Brendan" and "Brandon" may be 2 edits apart and the phone numbers (555) 555-6161 and (555) 555-6999 may be 3 edits apart. Determining the number of edits or substitutions between two strings in this way is sometimes referred to as determining the Levenshtein distance between two strings/numbers.

In various examples described herein, clusters of requests with hierarchical data representations (e.g., IP addresses, phone numbers, etc.) that are similar to one another (as determined by Levenshtein distance) and that are received within a predetermined amount of time (e.g., 5 minutes, 10 minutes, or some other suitable time period) may be determined. In various examples, such clusters of requests may be designated as anomalous (e.g., potentially malicious) if the ratio of the number of unique accounts (e.g., unique user accounts) associated with the requests to the number of requests in the cluster is less than a threshold ratio (e.g., 0.85, 0.9, or some other threshold ratio). Typically, valid requests made during a relatively short time period tend to have a 1-to-1 correspondence between the number of unique user accounts making the request and the total number of requests in a given cluster. Accordingly, if the ratio is significantly less than 1.0 there is a higher likelihood that the cluster of requests are related to an attack.

During the relevant time period, nodes (e.g., each node representing a phone number, IP address, combination of phone number and IP address, or other hierarchical data representation) may be connected and/or otherwise conceptually grouped into a cluster if the number of value substitutions (e.g., the Levenshtein distance) is less than or equal to a threshold value. Thereafter, the ratio of the number of unique accounts to the number of nodes of the cluster (e.g., the connected nodes) is determined and is compared to a threshold ratio. The cluster is denoted as anomalous if the ratio is less than the threshold ratio. The common root(s) of the hierarchical data structures of nodes in a cluster denoted as anomalous is determined. The common root(s) may be the ordered values in the hierarchical data representations that are shared among the nodes of the anomalous cluster. For example, a subset of IP addresses associated with an anomalous cluster may have the same values for the first 3 octets of the IP addresses (e.g., all nodes may be 192.141.8.XXX). The IP addresses and/or phone numbers of such anomalous clusters may be labeled as "fraudulent" and may be used as training data to train a neural network (e.g., an LSTM, a transformer, feed forward network, etc.) for click-to-call fraud detection. Additionally, non-fraudulent, valid click-to-call requests may also be included in the training data corpus to allow the model to distinguish between fraudulent and valid click-to-call requests.

In some examples, a neural network or other machine learning model trained for the click-to-call fraud prediction task may be implemented as a cloud computing service. Accordingly, a client device may make an application programming interface (API) call to such a service upon receiving a click-to-call request (and/or a batch of click-to-call requests). The API call may include at least one of the telephone number requested for callback and/or the IP address associated with the request. The service may input the data (e.g., after concatenation or other preprocessing) into the neural network trained using the training corpus described here. The neural network may output a fraud confidence score. A threshold confidence score (e.g., a threshold fraud confidence score) may be set by the individual client and/or may be determined (e.g., using statistical outlier detection) by the service and may be used to determine whether or not the particular request represents fraud. Accordingly, output data may be returned to the client that indicates whether or not the request is likely fraudulent. The client may thereafter block the request or allow the request depending on the output of the cloud service. In various other examples, the systems and techniques described herein may be implemented locally by the click-to-call system.

Advantageously, when a fraud prediction service (e.g., the fraud detection system 102 of FIG. 1) is employed as a centralized service that is accessible via API calls, the service may be improved over time to detect and/or prevent fraud from different attack infrastructures. The ability to detect different attack infrastructures (e.g., clusters of IP addresses, phone numbers, and/or other hierarchical data) may inure to the benefit of different entities availing themselves of the fraud prediction service even where the particular entity has not been victimized by the attack infrastructure in the past. For example, a first entity using the fraud prediction service may experience fraudulent click-to-call requests from a first cluster of IP addresses. The fraud prediction service may update weights of the machine learning model used to predict fraudulent attacks (e.g., premium phone number abuse fraud) based on the first cluster of IP addresses. Thereafter, a second entity using the fraud prediction service may prevent fraudulent attacks from that first cluster of IP addresses even though the second entity may not have experienced fraudulent attacks from that cluster in the past.

In some examples, IP addresses and/or telephone numbers associated with fraudulent requests may be blocked. For example, the IP addresses may be blocked for a specified period of time in order to avoid blocking legitimate service requests. For example, an IP address may be blocked by preventing and/or denying access by the IP address to the requested service. Similarly, in some examples, anomalous clusters may be defined for a particular period of time to avoid static definitions of adversarial networks.

In various examples, IP addresses/phone numbers/etc. that are blocked using the various techniques described herein may be monitored to determine if any of the blocked addresses are associated with a false positive. For example, if a particular IP address attempts to access the service through a different channel (e.g., email as opposed to a call-back service) the blocking of the IP address may be determined to be a false positive. In an example, if the number of false positives on a blocked list is above a certain percentage, an alert may be triggered and the blocked list may be evaluated by a human evaluator. In another example, a false positive that is incorrectly blocked from accessing a service may be granted access to the service after the blocked list expires (e.g., after 30 minutes, etc.). However, a blocked list's tenure may be renewed, extending the expiration time, if the potentially adversarial address(es) continually attempt to request the service.

In some examples, it may be difficult for fraudulent actors to obtain IP addresses and/or phone numbers that vary outside of a limited range of variation. Accordingly, modifying such phone numbers and/or IP addresses may be a bottleneck for the fraudsters' attack infrastructure. The machine learning models described herein may be used to detect and define the fraudulent infrastructure. Knowledge about different attack infrastructures may be used to build threat profiles of the different fraudulent infrastructures and/or attack patterns. In some cases, such information may be provided to law enforcement, regulatory agencies, and/or private companies to be used in fraud prevention and/or criminal investigations. Additionally, such information may be used to reduce the likelihood of on-going attacks from previously-detected attack infrastructures.

Machine learning techniques, such as those described herein, are often used to form predictions, solve problems, recognize objects in image data for classification, etc. For example, herein machine learning techniques may be used to predict whether or not incoming click-to-call requests are likely to be fraudulent. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

FIG. 1 is a block diagram illustrating example components of a fraud detection system 102, according to various embodiments of the present disclosure. In various examples, one or more computing devices may implement the fraud detection system 102. In examples where more than one computing device implements the fraud detection system 102, the different computing devices may communicate with one another over a network 104. For example, a remote computing device 130 (and/or remote system of computing devices) may implement a click-to-call service 110 where a programmatic interface may be provided for users to provide a telephone number and click a graphical user interface button to request a callback at the provided number. As described in further detail below, the remote computing device(s) 130 may use the fraud detection system 102 as a service. Accordingly, the click-to-call service 110 may send data to the fraud detection system 102 over network 104 to determine whether or not click-to-call requests are fraudulent.

In various examples, each of the one or more computing devices used to implement fraud detection system 102 may comprise one or more processors. The one or more computing devices used to implement fraud detection system 102 may be configured in communication with at least one non-transitory computer readable memory 103 ("memory 103"). In at least some examples, the one or more computing devices used to implement fraud detection system 102 may communicate with memory 103 over network 104. The memory 103 may store computer-readable instructions that, when executed by at least one processor of the one or more computing devices implementing fraud detection system 102, may be effective to program the one or more processors to perform the various fraud detection techniques and/or execute the various machine learned models described herein.

In various examples, network 104 is a wide area network, such as the Internet, while in other embodiments, the network 104 is a local area network (LAN) over which requests may be received. In some further embodiments, network 104 is a combination of the Internet and a LAN.

In various examples, the click-to-call service 110 may receive a plurality of requests. The requests may comprise an IP address (e.g., the IP address from which the request was received) and a telephone number (e.g., the telephone number requested for a callback from the click-to-call service 110). The remote computing device(s) 130 may send the IP addresses and/or the associated telephone numbers to the fraud detection system 102. In some examples, the fraud detection system 102 may perform preprocessing on the data received from the remote computing device(s) 130. For example, embedding data may be generated representing the IP address and/or phone number. In some other examples, data representing the IP address and telephone number may be concatenated to generate input data for input into neural network 160.

Although not shown in FIG. 1, in various examples, pre-processing may be used to normalize input to fraud detection system 102. For example, padding may be used to standardize the length of phone numbers to 17 digits. Padding may involve adding zeros to the beginning or end of the phone number so that all input phone numbers are of the same length. Padding may also be used for IP addresses and/or other input data in order to standardize the inputs to neural network 160.

Neural network 160 may be a deep learning network. Various implementations of the neural network 160 are possible. For example, the neural network 160 may be a long short term memory (LSTM) model, a transformer-based model (or other attention-based model), a multi-layer perceptron or other feed forward network, etc. As described in further detail below, the neural network 160 may be trained using training data samples comprising an IP address associated with a telephone number and a ground truth label indicating whether the particular training sample represents a fraudulent or a non-fraudulent click-to-call request. The neural network 160 may output a confidence score (e.g., between 0 and 1) from an output layer of the neural network 160 indicating a likelihood of the input request being fraudulent (or not fraudulent, depending on the implementation).

Accordingly, in the example of FIG. 1, three different click-to-call requests of click-to-call service 110 are sent to fraud detection system 102 (e.g., via an API call). The first click-to-call request comprises the IP address 108.171.130.175 and the telephone number 555-555-5453. The second click-to-call request comprises the IP address 108.198.465.101 and the telephone number 555-555-5116. The third click-to-call request comprises the IP address 104.111.232.121 and the telephone number 555-555-9430. Each of the three data pairs (e.g., the IP address and the telephone number) may be input by fraud detection system 102 into the neural network 160. For each of the three data pairs, the neural network 160 may output a respective fraud confidence score indicating a likelihood of the request corresponding to a fraudulent request (or a non-fraudulent request, depending on the implementation).

For example, for the first click-to-call request, the fraud confidence score is 0.7. For the second click-to-call request, the fraud confidence score is 0.11. The third click-to-call request has a fraud confidence score of 0.92. In various examples, the fraud confidence scores may be compared to a threshold fraud confidence score. In some examples, the threshold fraud confidence score may be a static threshold. For example, each client availing itself of the fraud detection system 102 may set its own threshold according to its own fraud risk tolerance. In some other examples, the threshold fraud confidence score may be dynamically determined (e.g., using statistical outlier detection methodologies). For example, fraud confidence scores that are greater than 2 standard deviations from a mean fraud confidence score may be determined to be outliers and fraudulent (or non-fraudulent).

In various examples, neural network 160 may be trained using various combinations of input data in addition to the IP addresses and/or phone numbers specifically described above. For example, inputs may include various combinations of phone numbers, IP addresses, country codes, number of contacts from a particular user or customer ID, the number of unique phone numbers received from a particular customer ID, etc. In general, machine learning models may be trained to take various combinations of such inputs in order to determine a likelihood of fraudulent activity. The particular inputs may vary depending on the desired implementation.

In some examples, if a particular click-to-call request is determined to be fraudulent (e.g., based on the fraud confidence score and the threshold fraud confidence score), data indicating that the request has been determined to be likely fraudulent may be sent back (e.g., via the API) to the client device (e.g., remote computing device(s) 130). The client device may then block the click-to-call request or may track the requests and/or determine fraud trends over time. In other examples, the fraud detection system 102 may send executable instructions effective to instruct systems of the click-to-call service to block the click-to-call request (e.g., to not call back the requested number).

In various examples, remote computing devices 130 may correspond to different entities availing themselves of the fraud detection system 102. In such examples, updating the fraud detection system 102 over time based on recently-received data (e.g., click-to-call requests) that is labeled (e.g., in accordance with the labeling techniques described herein) inures to the benefit of all the different entities using the fraud detection system 102, as the fraud detection system 102 becomes better able to detect different attack infrastructures, regardless of whether any particular entity has been attacked by a given attack infrastructure in the past.

Figure 2:
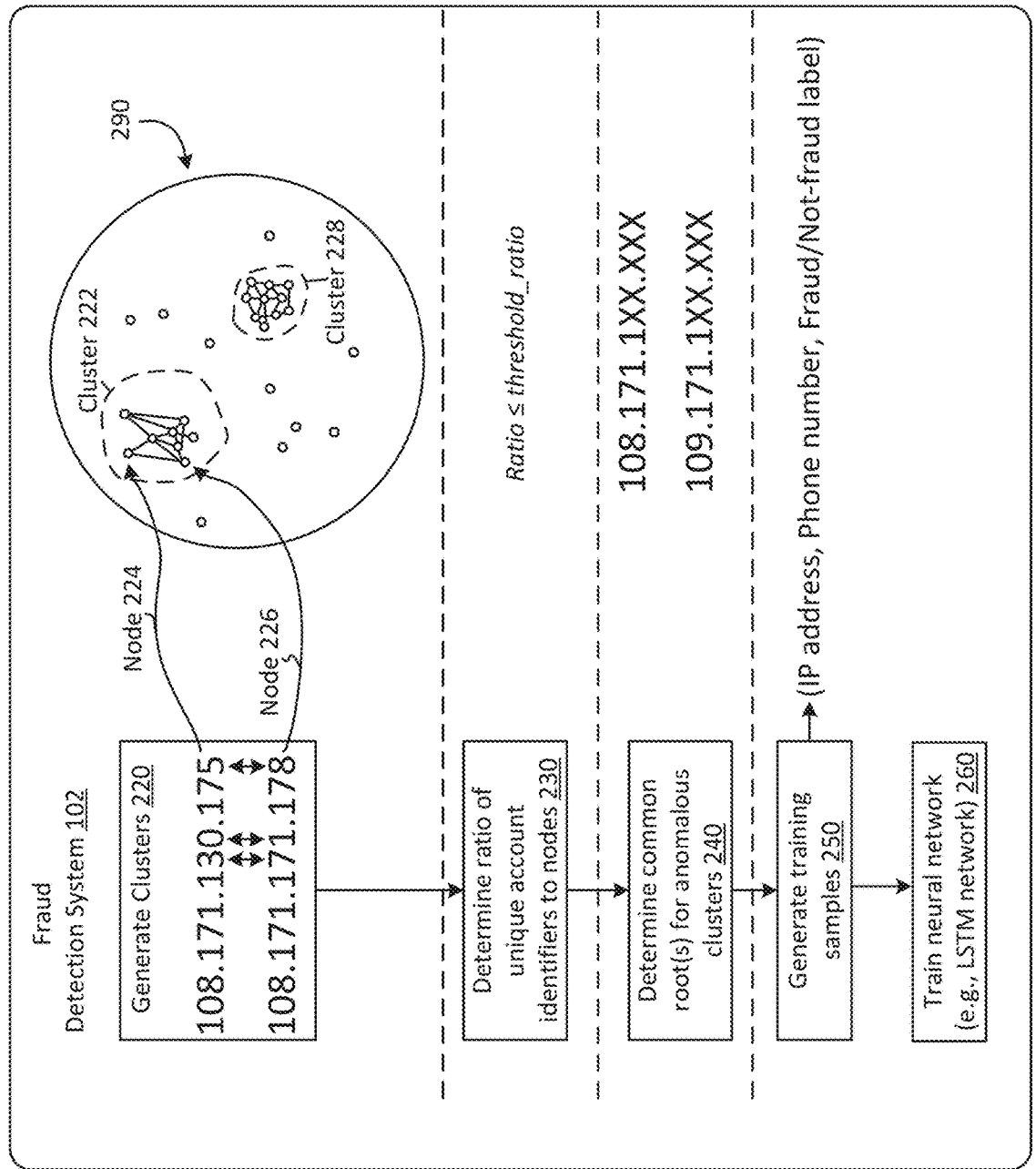
FIG. 2 is a diagram illustrating training of a fraud detection system, in accordance with various embodiments of the present disclosure.
Figure 2:
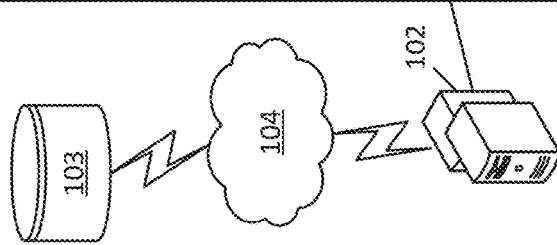

FIG. 2 is a diagram illustrating training of a fraud detection system, in accordance with various embodiments of the present disclosure. As previously described, a system (e.g., fraud detection system 102, remote computing device(s) 130, etc.) may receive requests to perform an action. The requests may be requests to access a compute service, a click-to-call service, online purchase requests, online support requests, and/or any type of request that may be made over a communications network. In various examples, fraud detection system 102 may receive the requests and may determine hierarchical data representations associated with each request. The hierarchical data representations may be any hierarchical representation of data, such as telephone numbers, IP addresses, geolocation coordinates, etc. Hierarchical data representations represent some hierarchy of data. For example, in an IP address, the first sequence of bits (e.g., the first octet in IPv4) may represent a network, while the final bits (e.g., of the final, right-most octet) may represent an individual node. In some examples, the middle two octets of an IP address may represent sub-networks, for easier request routing. Similarly, in phone numbers, the first digits (e.g., the left-most digits) typically represent the highest category of geographic locations (e.g., country codes), while the next level of digits may represent an area code. In some examples, the following digits may represent a city and/or a portion of a city, etc.

As requests for the relevant service are received, fraud detection system 102 may determine the positions of the nodes (with each node being represented by its corresponding hierarchical data representation) within a feature space 290. In various examples, fraud detection system 102 may generate clusters (action 220) of nodes over time periods. The time periods may be parameters that are pre-selected and/or that are determined based on, for example, a rate at which requests are being received. The clusters may represent similar IP addresses and/or phone numbers. For example, in the phone number context, phone numbers with 4-5 common numbers may be clustered together. For example, the country code and/or area code along with a few other common numbers in the prefix may be used for clustering. This is merely an example of clustering and other numbers of common digits may be used.

In the example depicted in FIG. 2, a first request may be received from the IP address 108.171.130.175. The first request may be represented as node 224 in feature space 290. Similarly, a second request may be received from the IP address 108.171.171.178. The second request may be represented as node 226 in feature space 290. Fraud detection system 102 may determine the number of value substitutions/differences/additions/deletions between the first request and the second request (e.g., between nodes 224 and 226). As indicated by the double-headed arrows in FIG. 2, there are 3 value substitutions between the IP address of the first request and the IP address of the second request (e.g., a Levenshtein distance of 3). The number of value substitutions/differences (e.g., the Levenshtein distance) may be compared to a threshold value. The threshold value may be a tunable parameter that may be manually selected and/or determined based on data representing a corpus of nodes (e.g., based on training data used to train a machine learning model that outputs an appropriate threshold value based on current and/or historical conditions). In an example, the threshold number of value substitutions may be 4. If two nodes (e.g., two hierarchical data representations) have a distance that is less than or equal to the threshold number, the nodes may be connected (e.g., clustered together) by fraud detection system 102.

In the current example, there are three substitutions between the IP address of node 224 and the IP address of node 226. Accordingly, the number of substitutions is less than the threshold and the nodes are clustered together into cluster 222. In the example depicted in FIG. 2 a plurality of other nodes are clustered together in cluster 228. In an example, two nodes are connected in the cluster if the number of value substitutions between the two nodes is less than or equal to (or simply less than in other embodiments) the threshold number.

Fraud detection system 102 may determine, for each cluster, a ratio of the number of unique account identifiers (and/or unique user identifiers) to the number of nodes (action 230). For example, fraud detection system 102 may determine the account identifier associated with each node of cluster 222. Account identifiers (or other identifying data) may be provided as metadata along with the service request (e.g., as a result of a user logging in prior to requesting the service). In various examples, requests that are not associated with any account identifiers (or other identifying data) may be considered as emanating from a single entity. The ratio of unique account identifiers to the number of requests/nodes in a cluster may be compared to a threshold ratio. If the ratio is less than the threshold ratio (or less than or equal to depending on the implementation), the cluster may be marked as anomalous for purposes of further processing/attack prevention. Thereafter, IP addresses and/or phone numbers associated with an anomalous cluster may be labeled as fraudulent when generating training samples (action 250). IP address and/or phone numbers that are not associated with an anomalous cluster may be labeled as non-fraudulent when generating training samples (action 250).

After a sufficient number of training samples is generated (the number of training samples may be variable depending on the desired implementation, model type, etc.), a neural network may be trained (action 260) for the task of predicting fraud confidence scores for at an input IP address, telephone number, and/or pair of an IP address and a telephone number. For example, the neural network 160 of FIG. 1 may be trained (or retrained) using training data generated in accordance with the procedure described above.

In some other implementations, the set of labeled training data used to train neural network 160 may be generated in other ways apart from the specific techniques described above in reference to FIG. 2. In general, training data may comprise at least one of an IP address, a telephone number, and a label indicating whether the IP address and/or telephone number are associated with a fraudulent request. In various examples, an LSTM or other model that learns information about input sequences (e.g., an attention-based model) may be advantageous due to its ability to learn patterns in the hierarchical data representations that are commonly present in adversarial IP and/or telephone networks.

For example, there may be 20 nodes in cluster 222 (representing 20 separate requests for a service). Among the 20 nodes, 10 may be associated with a single account identifier and 5 may not be associated with any account identifier. Each of the remaining 5 nodes may be associated with their own, respective account identifiers. Accordingly, in the current example the ratio=(1+1+5)/20=7/20=0.35. In the current example, the threshold ratio may be 0.65 (although any suitable value may be used). Since the calculated ratio is less than the threshold ratio, cluster 222 may be designated as anomalous.

In another example implementation, the ratio may be the number of nodes (e.g., the number of similar click-to-call requests, similar IP addresses, and/or similar phone numbers) to the number of unique account identifiers may be used (e.g., the inverse of the ratio described above). In such an implementation, a cluster may be deemed fraudulent when the ratio is above a particular threshold ratio.

Fraud detection system 102 may determine the common root(s) for anomalous clusters (action 240). In various examples, upon designation of a cluster as anomalous, fraud detection system 102 may determine the common root(s) among the hierarchical data representations associated with that cluster. Each IP address includes a set of ordered numbers (e.g., 4 octets). The common root may be the set of ordered numbers common to a subset of nodes of the anomalous clusters (or to all nodes of the anomalous cluster). For example, all the IP addresses associated with at least some nodes of cluster 222 may include the same values for the first 2 octets—108 and 171, respectively. Similarly, the third octet, when expressed in decimal notation, may have three digits and all nodes may have a 1 as the first digit, although the remaining two digits may differ among the different nodes. Accordingly, in decimal form, the common root for cluster 222 may be 108.171.1XX.XXX with the Xs representing variable, generic values. Although in the foregoing example, the common root comprises only contiguous values within the decimal representation of the IP addresses, in at least some examples, the common values need not be contiguous. In some examples, data at higher hierarchical levels representing more general data (e.g., the first octet and/or first two octets of an IP address and/or the area code of a telephone number) may be disregarded for purposes of determining the common root(s). For example, there may be a single substitution between the IP address 108.171.130.175 and the IP address 109.171.130.175. However, since this substitution occurs in the first octet (e.g., replacing the "8" with the "9"), this substitution may be ignored. In the example, the common roots for this example cluster may be determined to be any IP address beginning with 108.171.XXX.XXX or 109.171.XXX.XXX, as the first two octets may be disregarded. In various examples, IP addresses and/or telephone numbers associated with anomalous clusters and/or with detected fraud may be labeled as such and used to train neural network at action 260.

In various examples, the training data used to train a fraud detection neural network (e.g., neural network 160) may be generated in different ways apart from the techniques described with respect to FIG. 2. For example, historical data may be used to determine whether past requests were fraudulent or non-fraudulent. Such requests may be labeled as such and may be included in a training data set. Once a sufficient number of training samples are available, the training data set may be used to train neural network 160. The number of training samples required may vary according to the desired implementation.

Advantageously, the methods of generating supervised training data (e.g., as described above in reference to FIG. 2) may allow for weights of the fraud detection models (e.g., neural network 160 such as an LSTM, transformer, etc.) to be updated based on recent training data generated via use of the fraud detection system as a service without training the models based on the entire training corpus. For example, the process of generating training data described above in reference to FIG. 2 may be automated. Accordingly, the fraud detection models may be periodically updated (and/or updated when a threshold number of new training instances are generated). This may allow the models to be updated quickly, due to the reduced training set, while maintaining the ability and agility to detect recent attack infrastructures.

Figure 3:
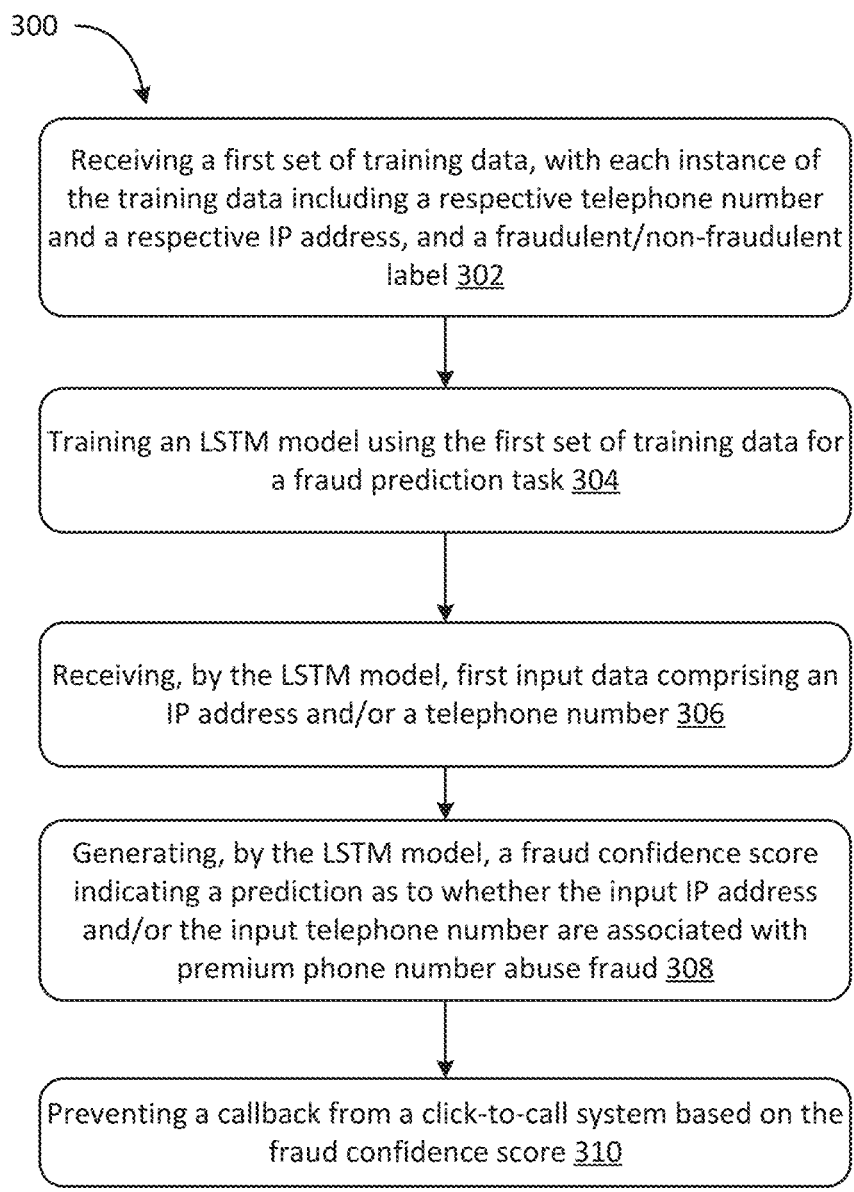
FIG. 3 is a flow diagram illustrating an example process for prevention of an adversarial attack, in accordance with various aspects of the present disclosure.

FIG. 3 depicts a flow chart showing an example process 300 for prevention of an adversarial attack, in accordance with various aspects of the present disclosure. The process 300 of FIG. 3 may be executed by one or more computing devices. The actions of process 300 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 300 may be described above with reference to elements of FIGS. 1-2.

Process 300 may begin at action 302, at which a first set of training data may be received. In various examples, each instance of the training data may include a respective telephone number and a respective IP address along with a binary fraudulent/non-fraudulent label. In some other examples, the training data (e.g., training instances) may comprise either an IP address or a telephone number along with the binary fraudulent/non-fraudulent label. However, in at least some implementations, using both the IP address and the telephone number may provide increased precision of adversarial attack (e.g., click-to-call fraud) detection. In various examples, the training data may be generated using the various techniques described above in reference to FIG. 2. For example, the fraudulent/non-fraudulent labels may be generated based on detection of adversarial clusters based on a ratio of unique account identifiers (e.g., unique customer identifiers) to the number of nodes having similar IP address, phone numbers, or other similar hierarchical representation data.

Processing may continue from action 302 to action 304, at which an LSTM model may be trained using the first set of training data for a fraud prediction task. For example, the LSTM model may be trained to receive IP addresses and/or phone numbers as input data. The LSTM model may be trained to predict whether or not the input data (e.g., the IP address and/or phone number) is associated with a fraudulent request (e.g., a fraudulent click-to-call request).

Processing may continue from action 304 to action 306, at which the LSTM model may receive first input data comprising an IP address and/or a telephone number. In various examples, the input data may be pre-processed prior to input into the LSTM model. For example, the IP address and/or telephone number may be concatenated or otherwise combined for input into the LSTM model. In other examples, the LSTM may be configured to receive numerical data representing the IP address and/or telephone number without concatenating or otherwise preprocessing the numbers.

Processing may continue from action 306 to action 308, at which the LSTM model may generate a fraud confidence score indicating a prediction as to whether the input IP address and/or the input telephone number are associated with premium phone number abuse fraud. In some embodiments, the fraud confidence score may range from 0 to 1 with higher values indicating a stronger likelihood of fraud. In another implementation, lower values may indicate a stronger likelihood of fraud.

Processing may continue from action 308 to action 310, at which a callback of a click-to-call system (e.g. a click-to-call service) may be prevented based on the fraud confidence score. In some examples, the fraud confidence score may be compared to a threshold that is specific to the particular click-to-call system in order to determine whether to prevent the callback. In other examples, the callback may be prevented when the fraud confidence score is determined to be a statistical outlier with respect to the average fraud confidence score for the particular click-to-call system.

Figure 4:
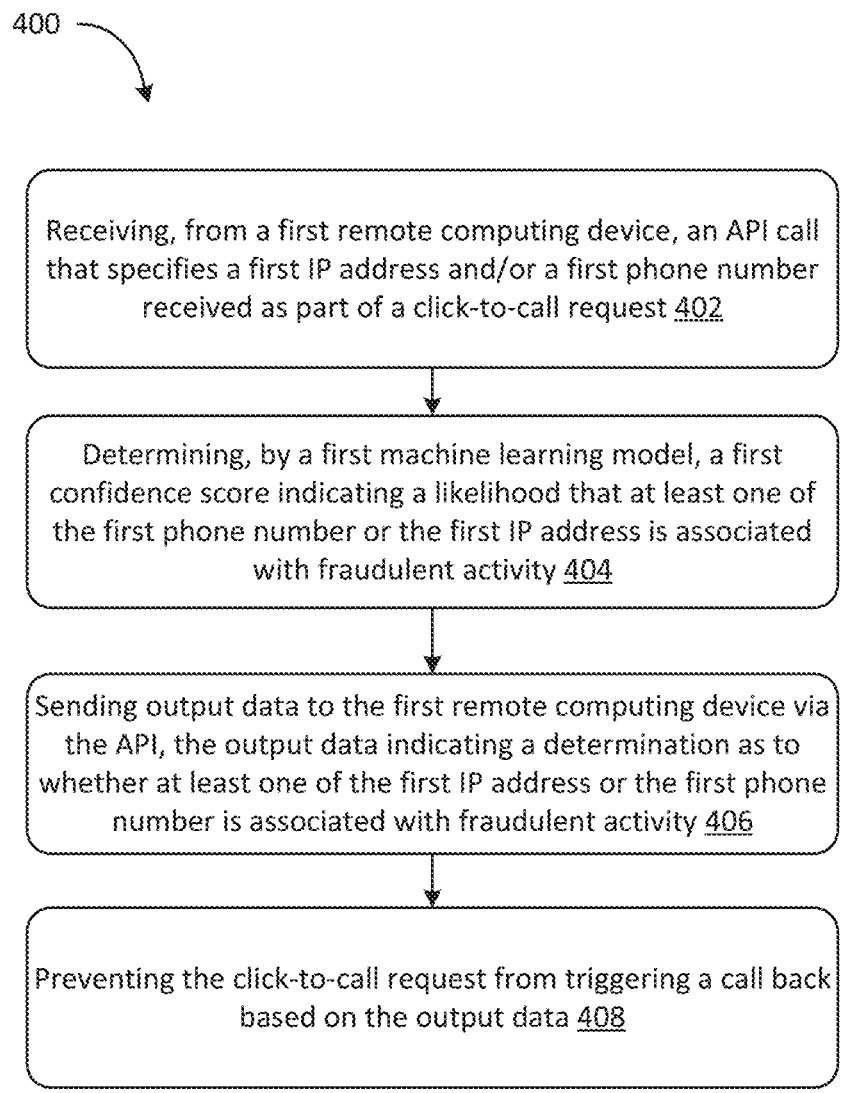
FIG. 4 is a flow diagram illustrating another example process for prevention of an adversarial attack, in accordance with various aspects of the present disclosure.

FIG. 4 is a flow diagram illustrating another example process 400 for prevention of an adversarial attack, in accordance with various aspects of the present disclosure.

The process 400 of FIG. 4 may be executed by one or more computing devices. The actions of process 400 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 400 may be described above with reference to elements of FIGS. 1-3.

Process 400 may being at action 402, at which an API call may be received from a first remote computing device. The API call may include data specifying a first IP address and/or a first telephone number received as part of a click-to-call request. For example, the first remote computing device and/or a device in communication with the first remote computing device may implement a click-to-call service. The click-to-call service may receive a click-to-call request from the first IP address. The click-to-call request may be a request to programmatically call the first telephone number.

Processing may continue from action 402 to action 404, at which a first machine learning model may determine a first confidence score indicating a likelihood that at least one of the first telephone number or the first IP address (or the click-to-call request generally) is associated with fraudulent activity (e.g., premium phone number fraud). In various examples, the first machine learning model may be an LSTM, transformer, and/or other neural network trained using supervised learning, as described herein. The first machine learning model may be trained to generate a confidence score indicating a likelihood that a particular request (e.g., an IP address and/or telephone number) is likely to be fraudulent (or non-fraudulent).

Processing may continue from action 404 to action 406, at which output data may be sent to the first remote computing device that indicates a determination as to whether at least one of the first IP address or the first telephone number is associated with fraudulent activity. In various examples, the output data may be the confidence score generated by the first machine learning model. However, in other examples, the confidence score may be compared to a threshold and/or may be statistically analyzed to determine if the confidence score represents a statistical outlier. In such examples, the output data may indicate a decision as to whether the click-to-call request received at action 402 has been determined to be likely fraudulent or non-fraudulent.

Processing may continue from action 406 to action 408, at which the click-to-call request may be prevented from triggering a call back based on the received output data. For example, if the output data indicates that the click-to-call request received at action 402 is likely to be fraudulent, the click-to-call system may prevent a callback from occurring and/or may perform additional verification prior to performing the callback.

Figure 5:
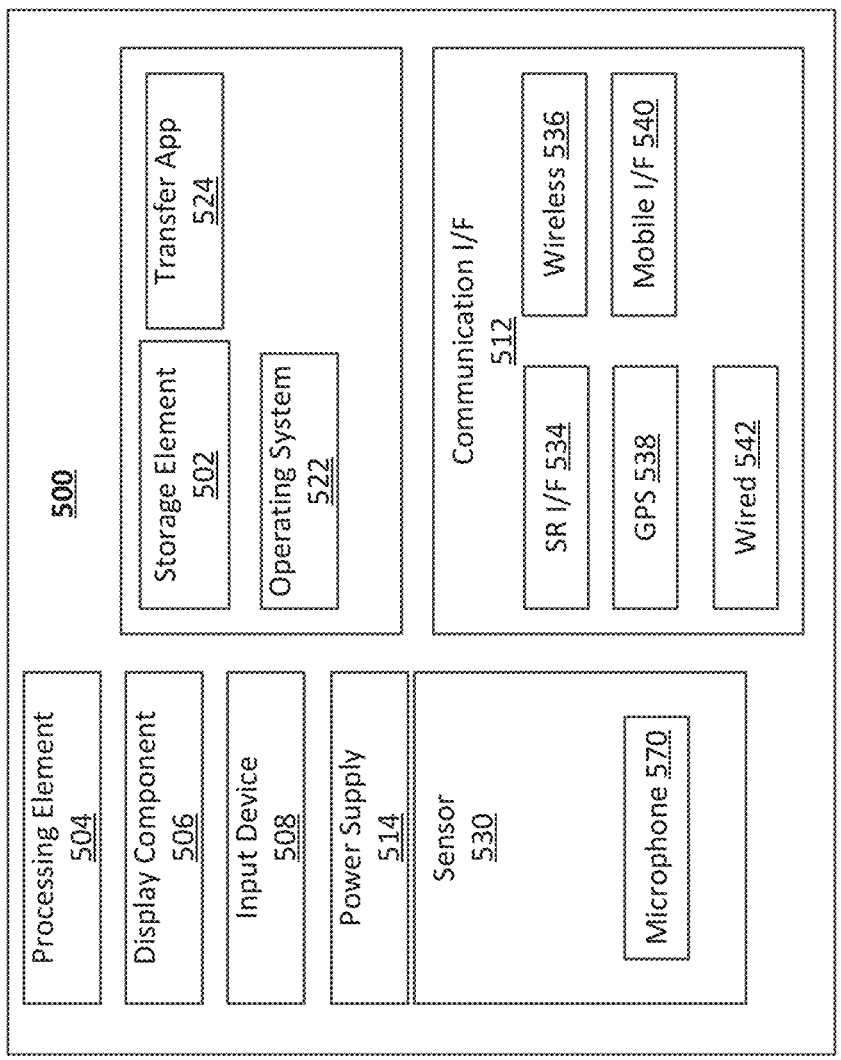
FIG. 5 is a block diagram showing an example architecture of a computing device that may be used in accordance with various embodiments described herein.

FIG. 5 is a block diagram showing an example architecture 500 of a computing device that may be configured to detect click-to-call fraud, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or hierarchical data representations.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components.

Figure 6:
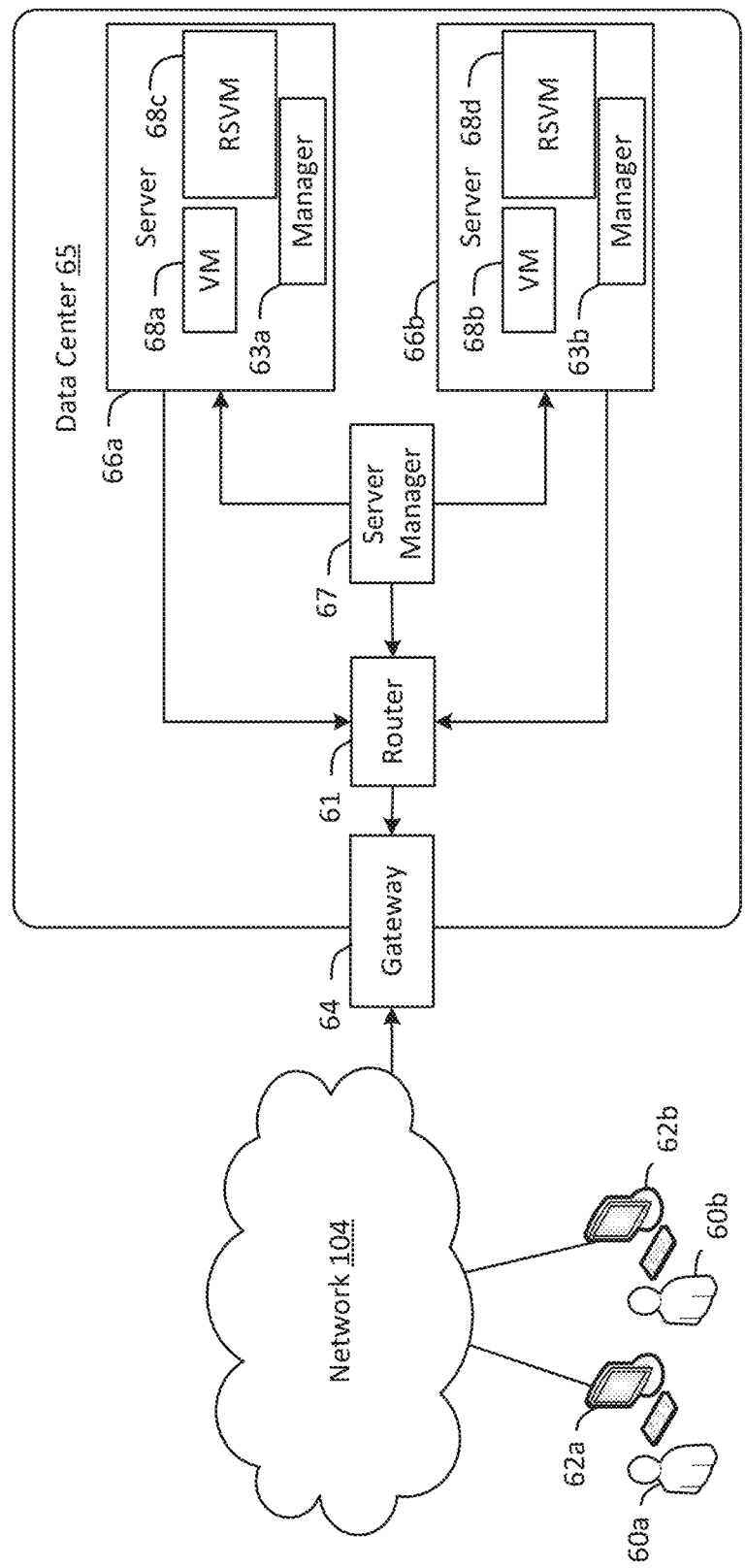
FIG. 6 is a diagram illustrating an example system for sending and providing data that may be used in accordance with the present disclosure.

An example system for sending and providing data and detecting click-to-call fraud will now be described in detail. In particular, FIG. 6 illustrates an example computing environment in which the embodiments described herein may be implemented. For example, the computing environment of FIG. 6 may be configured to provide adversarial network detection as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various adversarial network detection described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of detecting fraudulent activity, the method comprising:
    generating a first set of training data, wherein a first training instance of the first set of training data comprises a first internet protocol (IP) address, a first telephone number, and a first label indicating whether at least one of the first IP address or the first telephone number are associated with premium phone number abuse fraud;
    training a long short term memory (LSTM) model using the first set of training data;
    receiving, by the LSTM model, first input data comprising a second IP address and a second telephone number; and
    generating, by the LSTM model, a first confidence score indicating a prediction as to whether the second IP address and the second telephone number are associated with premium phone number abuse fraud.

2. The computer-implemented method of claim 1, further comprising:
    determining a threshold confidence score;
    comparing the first confidence score to the threshold confidence score; and
    preventing the second IP address from accessing a callback service based on comparison of the first confidence score to the threshold confidence score.

3. The computer-implemented method of claim 1, further comprising:
    determining, over a first time period, a first group of internet protocol (IP) addresses, wherein each IP address of the first group of IP addresses, when expressed in decimal notation, comprises four or fewer different values from each other IP address of the first group of IP addresses;
    determining a number of unique user identifiers associated with the first group of IP addresses;
    determining a ratio of the number of unique user identifiers to a number of IP addresses in the first group of IP addresses; and
    determining that the ratio is less than a threshold ratio, wherein the first IP address of the first training instance is among the first group of IP addresses.

4. A method, comprising:
    generating a first machine learning model based at least in part on a ratio of a first number of requests to use a first service and a second number of account identifiers associated with the first number of requests;
    receiving, from a first remote computing device, first data specifying at least one of a first internet protocol (IP) address or a first telephone number by a fraud detection service using an application programming interface (API) of the fraud detection service;
    determining, by the first machine learning model of the fraud detection service, a first confidence score indicating a likelihood that at least one of the first telephone number or the first IP address is associated with premium phone number fraud; and
    sending output data to the first remote computing device via the API, the output data indicating a determination as to whether at least one of the first IP address or the first telephone number is associated with premium phone number fraud.

5. The method of claim 4, wherein the first IP address and the first telephone number are associated with an automated click-to-call request received by the first remote computing device.

6. The method of claim 4, wherein the first machine learning model comprises a neural network, the method further comprising:
    inputting data representing the first telephone number and the first IP address into the neural network; and
    determining the first confidence score from an output layer of the neural network.

7. The method of claim 4, further comprising:
    determining the second number as a number of unique account identifiers associated with a first plurality of click-to-call requests; and
    determining a hierarchical data representation common to the first plurality of click-to-call requests.

8. The method of claim 7, further comprising:
determining the ratio as the second number of unique account identifiers associated with the first plurality of click-to-call requests to the first number, wherein the first number is the number of the first plurality of click-to-call requests; and
determining that the ratio is less than a threshold ratio.

9. The method of claim 8, further comprising:
determining that the first plurality of click-to-call requests are fraudulent based at least in part on the ratio being less than the threshold ratio; and
generating a first training data instance comprising the hierarchical data representation and a label indicating that the first training data instance is fraudulent.

10. The method of claim 9, further comprising updating parameters of the first machine learning model based at least in part on the first training data instance.

11. The method of claim 4, further comprising determining that a return telephone call not be made to the first telephone number based at least in part on the first confidence score.

12. The method of claim 11, further comprising sending executable instructions to the remote computing device, the executable instructions effective to prevent a telephone call from being made to the first telephone number based at least in part on the first confidence score.

13. A system, comprising:
at least one processor; and
at least one non-transitory computer-readable memory configured in communication with the at least one processor, the at least one non-transitory computer-readable memory storing instructions that, when executed by the at least one processor, are effective to program the at least one processor to:
generate a first machine learning model based at least in part on a ratio of a first number of requests to use a first service and a second number of account identifiers associated with the first number of requests;
receive, from a first remote computing device, first data specifying at least one of a first internet protocol (IP) address or a first telephone number by a fraud detection service using an application programming interface (API) of the fraud detection service;
determine, by the first machine learning model of the fraud detection service, a first confidence score indicating a likelihood that at least one of the first telephone number or the first IP address is associated with premium phone number fraud; and
send output data to the first remote computing device via the API, the output data indicating a determination as to whether at least one of the first IP address or the first telephone number is associated with premium phone number fraud.

14. The system of claim 13, wherein the first IP address and the first telephone number are associated with an automated click-to-call request received by the first remote computing device.

15. The system of claim 14, wherein the first machine learning model comprises a neural network, the at least one non-transitory computer-readable memory storing further instructions that, when executed by the at least one processor, are further effective to program the at least one processor to:
input data representing the first telephone number and the first IP address into the neural network; and
determine the first confidence score from an output layer of the neural network.

16. The system of claim 13, the at least one non-transitory computer-readable memory storing further instructions that, when executed by the at least one processor, are further effective to program the at least one processor to:
determine the second number as a number of unique account identifiers associated with a first plurality of click-to-call requests; and
determine a hierarchical data representation common to the first plurality of click-to-call requests.

17. The system of claim 16, the at least one non-transitory computer-readable memory storing further instructions that, when executed by the at least one processor, are further effective to program the at least one processor to:
determine the ratio as the second number of unique account identifiers associated with the first plurality of click-to-call requests to the first number, wherein the first number is the number of the first plurality of click-to-call requests; and
determine that the ratio is less than a threshold ratio.

18. The system of claim 17, the at least one non-transitory computer-readable memory storing further instructions that, when executed by the at least one processor, are further effective to program the at least one processor to:
determine that the first plurality of click-to-call requests are fraudulent based at least in part on the ratio being less than the threshold ratio; and
generate a first training data instance comprising the hierarchical data representation and a label indicating that the first training data instance is fraudulent.

19. The system of claim 18, the at least one non-transitory computer-readable memory storing further instructions that, when executed by the at least one processor, are further effective to program the at least one processor to update parameters of the first machine learning model based at least in part on the first training data instance.

20. The system of claim 13, the at least one non-transitory computer-readable memory storing further instructions that, when executed by the at least one processor, are further effective to program the at least one processor to determine that a return telephone call not be made to the first telephone number based at least in part on the first confidence score.

* * * * *